(No Model.)

W. H. PERRY.
NAIL OR SPIKE.

No. 333,889. Patented Jan. 5, 1886.

Witnesses.
A. A. Connolly
W. C. Chaffee

Wm. H. Perry
Inventor
by Connolly Bros
Attys

N. PETERS. Photo-Lithographer, Washington, D. C.

UNITED STATES PATENT OFFICE.

WILLIAM H. PERRY, OF SHARON, PENNSYLVANIA.

NAIL OR SPIKE.

SPECIFICATION forming part of Letters Patent No. 333,889, dated January 5, 1886.

Application filed September 7, 1885. Serial No. 176,390. (No model.)

*To all whom it may concern:*

Be it known that I, WILLIAM H. PERRY, a citizen of the United States, residing at Sharon, in the county of Mercer and State of Pennsylvania, have invented certain new and useful Improvements in the Manufacture of Nails and Spikes; and I do hereby declare the following to be a full, clear, and exact description of the invention, reference being had to the accompanying drawings, which form a part of this specification.

This invention has relation to the manufacture of nails or spikes; and it consists in the production, as a new article of manufacture, of a nail or spike having two or more longitudinal grooves furnished with teeth or barbs, all as hereinafter more fully described and claimed.

The accompanying drawings illustrate several forms of nails or spikes shaped in keeping with the essential idea of my invention, which is that of a cylinder or other appropriate form longitudinally grooved and barbed.

Figure 1:
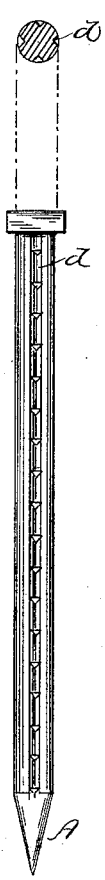
Figure 2:
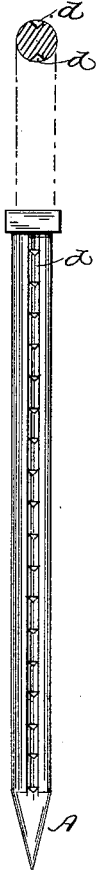
Figure 3:
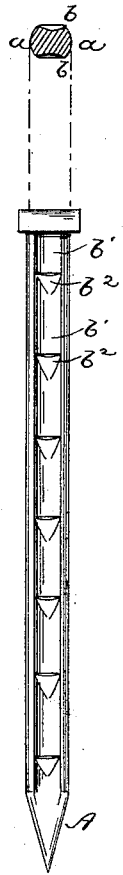

Figures 1 and 2 show the cylindrical shape, while Fig. 3 shows a nail having two of its sides, $a\ a$, rounded, while its two other sides, $b\ b$, are flattened, the grooves $b'$ and barbs $b^2$ being produced on the flattened sides.

In the rounded or cylindrical form there may be two or more grooves, $d$, formed directly in the cylindrical portion without special flattening.

The object in flattening the two sides is to render the nail oblong in cross-section, or narrower in one direction than in the other, and to thus adapt the nail to special uses where good penetrating qualities are required, and where it is necessary to guard against splitting the wood into which the nail is driven.

It will be observed and understood that a nail or spike of the construction described possesses advantages over barbed nails or spikes, as heretofore made.

By grooving the nail or spike, and forming the barbs within the grooves, I provide a barb the outer edge of which conforms to the contour or is flush with the surface of the nail or spike; hence the barb does not interfere with the penetrating qualities of the nail or spike or obstruct its passage; but when the nail is driven in, the barbs, which are preferably beveled on their under sides and squared on top, obtain a purchase on the wood, which serves to maintain the nail or spike rigidly and securely in its seat.

These nails or spikes are what is known as "wire nails and spikes," the body thereof being of the form and appearance of wire or slender rod of uniform diameter throughout its entire length, except at the point, which is of a rounded conical shape, as shown at A.

Such spikes or nails are produced by first rolling an ingot or billet to a rod of the required shape and dimensions, producing the grooves and barbs in the last pass, which is made through rolls having flanges to produce the grooves and indentations or notches in said flanges to form the barbs. After the rod is grooved and barbed, it is fed into suitable machines which form the head and point.

I do not wish it to be understood that I confine my invention to any precise form in cross-section of the body of the nail or spike, as such form may be varied without departing from the spirit of my invention. Neither do I wish to be understood as limiting myself to a nail or spike having any particular form of head or point.

Having described my invention, I claim—

1. As a new article of manufacture, a pointed and headed nail or spike of a cylindrical or partially-cylindrical shape in cross-section, having two or more longitudinal grooves, with barbs or projections formed in said grooves, substantially as described.

2. As a new article of manufacture, a nail or spike of cylindrical or partially-cylindrical shape in cross-section, having two or more longitudinal grooves of uniform depth extending substantially from the head to the point, and having formed within said grooves teeth or barbs whose outer extremities or edges are flush and even with the surface of the nail or spike, as set forth.

In testimony that I claim the foregoing I have hereunto set my hand this 3d day of September, 1885.

WILLIAM H. PERRY.

Witnesses:
JOHN H. ELLIOTT,
F. T. ASCHMAN.